P. F. KING.
COTTON SEED DELINTER.
APPLICATION FILED NOV. 13, 1909.
974,574.
Patented Nov. 1, 1910.
6 SHEETS—SHEET 1.
Fig. I
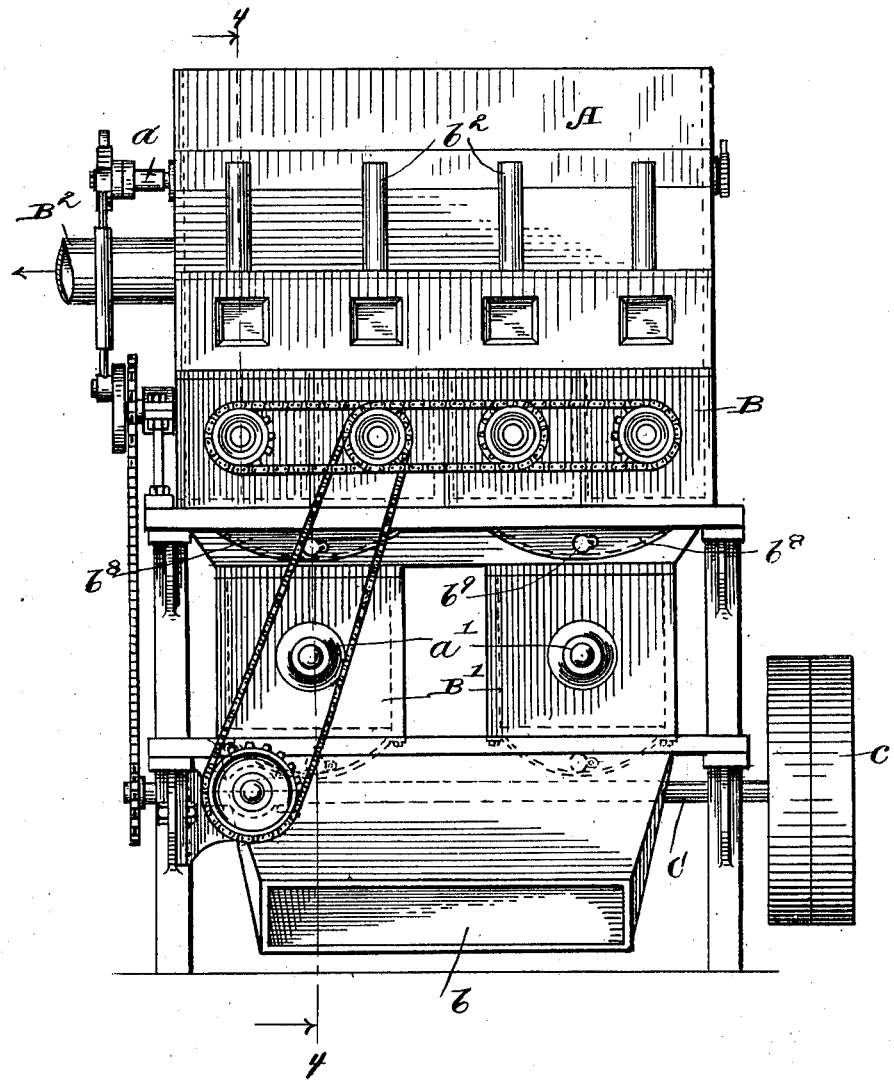
Witnesses:
J. C. Turner
Jno. F. Oberlin
Inventor:
Phineas F. King
By J. B. Fay
Attorney P. F. KING.
COTTON SEED DELINTER.
APPLICATION FILED NOV. 13, 1909.
974,574.
Patented Nov. 1, 1910.
6 SHEETS—SHEET 2.
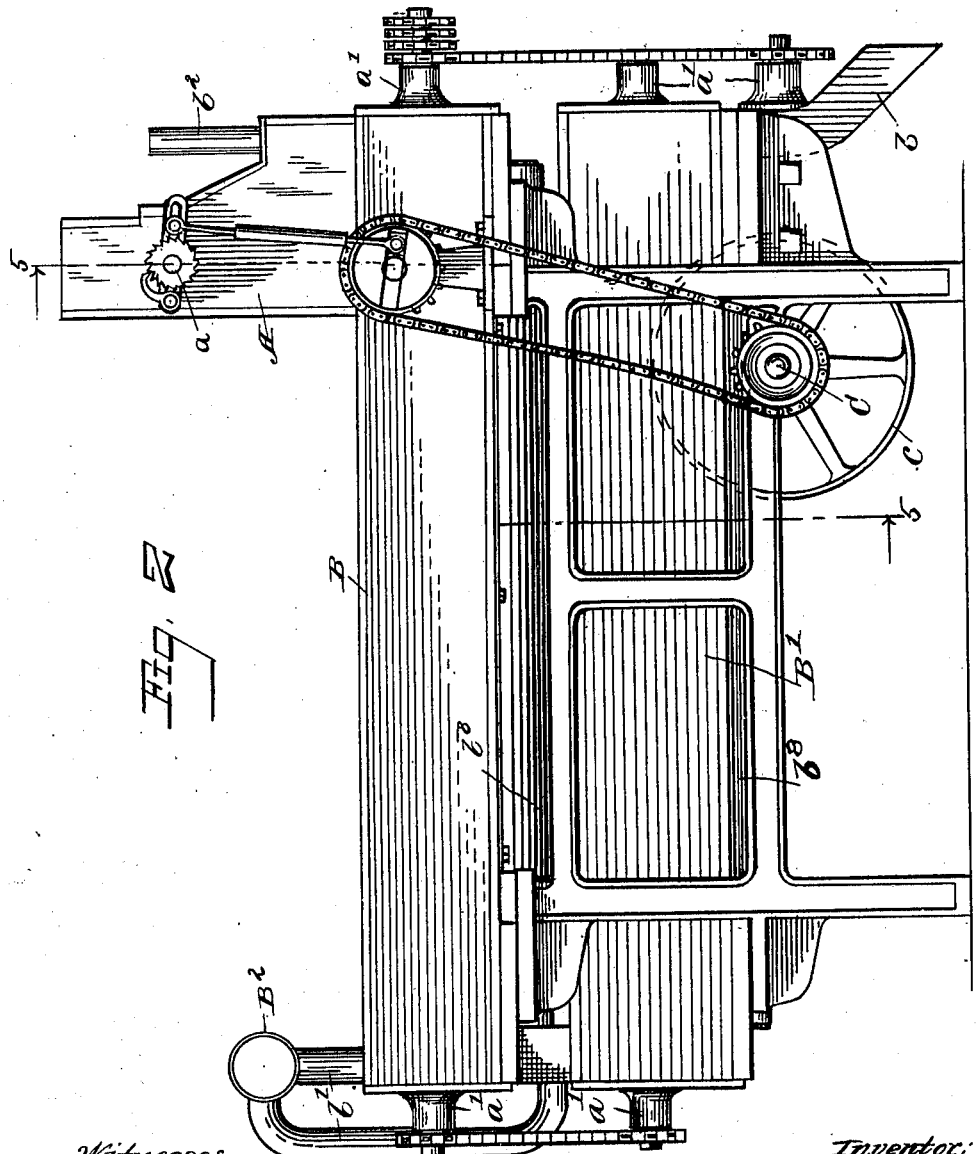

P. F. KING.
COTTON SEED DELINTER.
APPLICATION FILED NOV. 13, 1909.
974,574.
Patented Nov. 1, 1910.
6 SHEETS—SHEET 3.
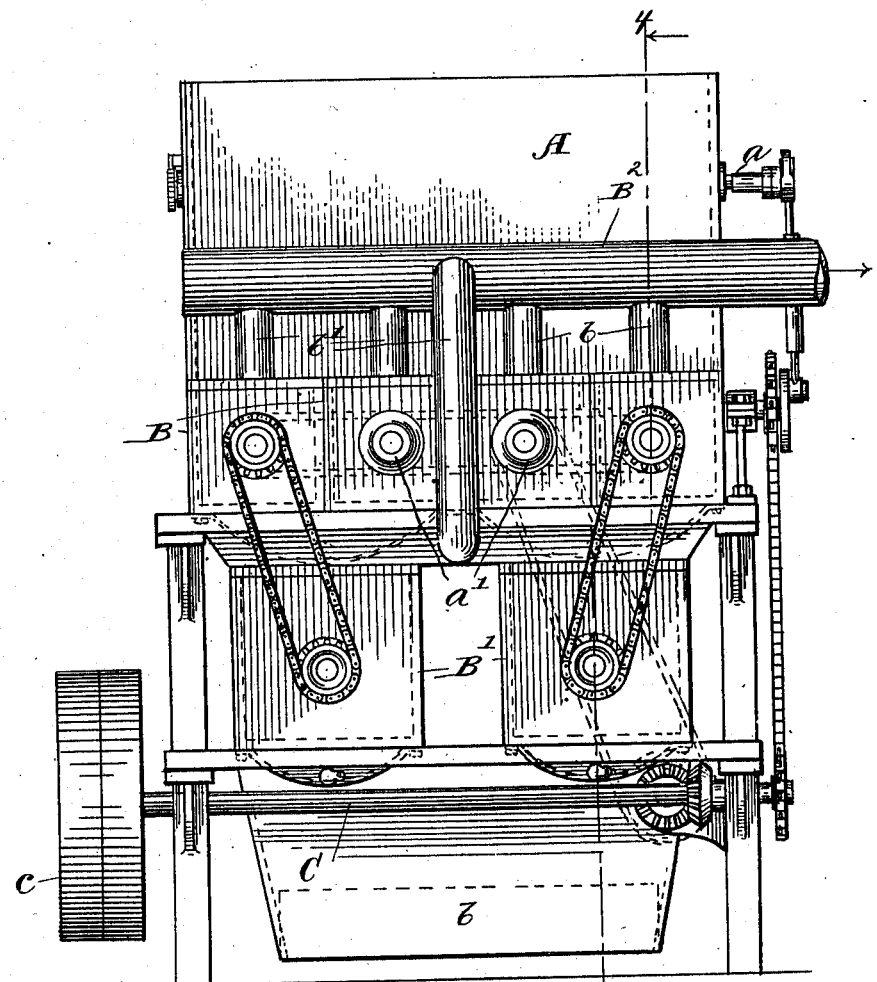
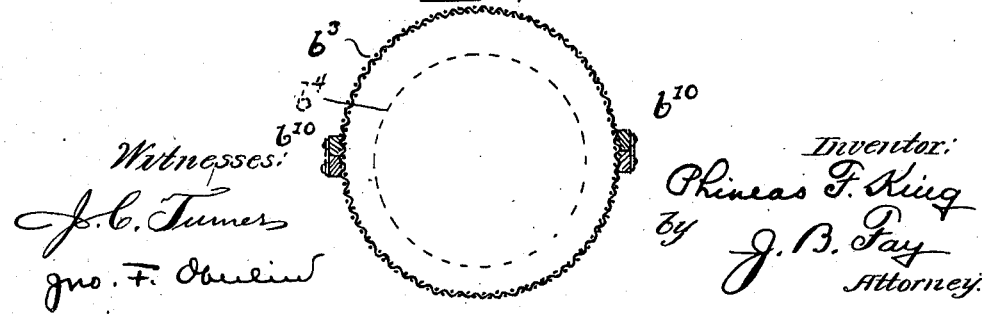

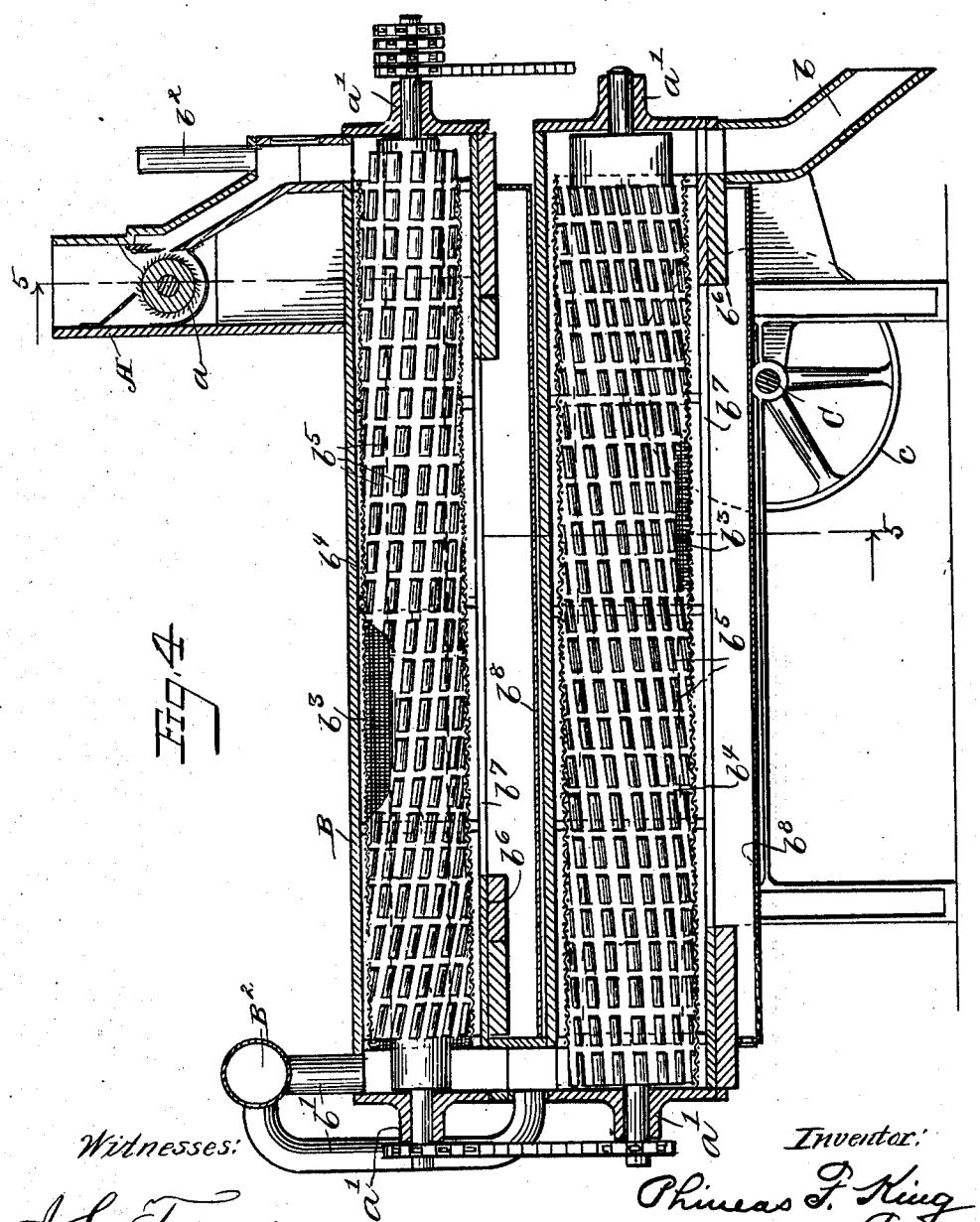

P. F. KING.
COTTON SEED DELINTER.
APPLICATION FILED NOV. 13, 1909.
974,574.
Patented Nov. 1, 1910.
6 SHEETS—SHEET 5.
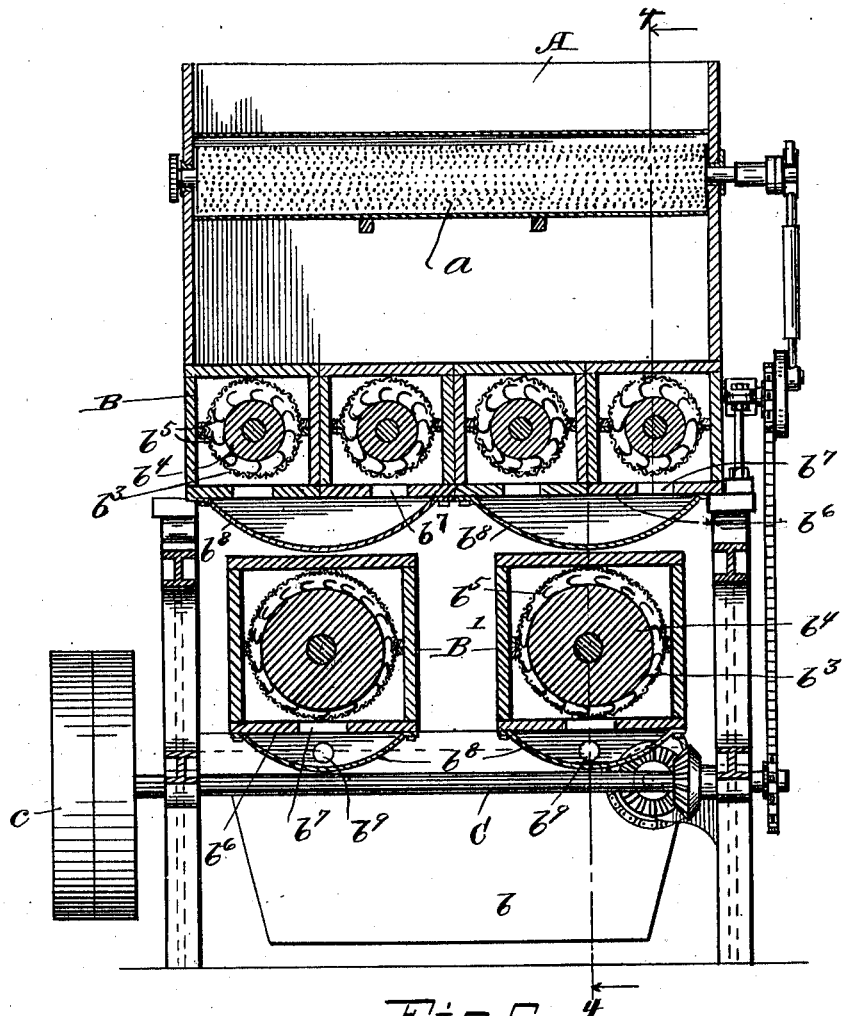
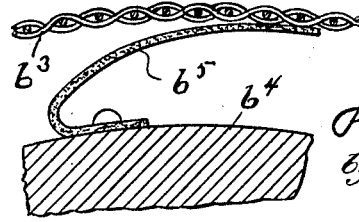

P. F. KING.
COTTON SEED DELINTER.
APPLICATION FILED NOV. 13, 1909.

974,574.

Patented Nov. 1, 1910.
6 SHEETS—SHEET 6.

Witnesses:
J. C. Turner
Jno. F. Ober___

Inventor:
Phineas F. King
by J. B. Fay
Attorney.

UNITED STATES PATENT OFFICE.

PHINEAS F. KING, OF CLEVELAND, OHIO, ASSIGNOR TO THE LANNERT-KING COMPANY, OF CLEVELAND, OHIO, A CORPORATION OF OHIO.

COTTON-SEED DELINTER.

974,574.   Specification of Letters Patent.   Patented Nov. 1, 1910.

Application filed November 13, 1909. Serial No. 527,762.

*To all whom it may concern:*

Be it known that I, PHINEAS F. KING, citizen of the United States, and resident of Cleveland, county of Cuyahoga, and State of Ohio, have invented a new and useful Improvement in Cotton-Seed Delinters, of which the following is a specification, the principle of the invention being herein explained and the best mode in which I have contemplated applying that principle, so as to distinguish it from other inventions.

As indicated, the present invention relates to a machine for delinting cotton seed, that is, for removing the lint or short fiber ends that cling to the hulls of cotton seed, particularly; although it is contemplated that there may be other seeds or similar objects requiring equivalent treatment, for the handling of which such machine will prove equally adaptable.

In designing the machine, it has been sought to provide one that while having a large capacity, will be economical in the use of power, and, what is more important, will effect the delinting of the seeds in a uniformly thorough fashion and without crushing or breaking their hulls.

To the accomplishment of the foregoing and related ends, said invention, then, consists of the means hereinafter fully described, and particularly pointed out in the claims.

The annexed drawings and the following description set forth in detail certain mechanism embodying the invention, such disclosed means constituting, however, but one of various mechanical forms in which the principle of the invention may be used.

Figure 8:
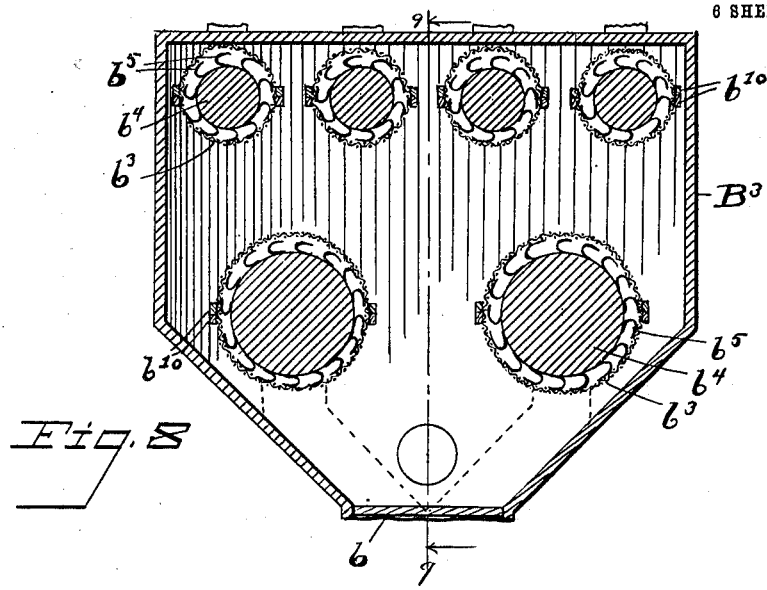
Figure 7:
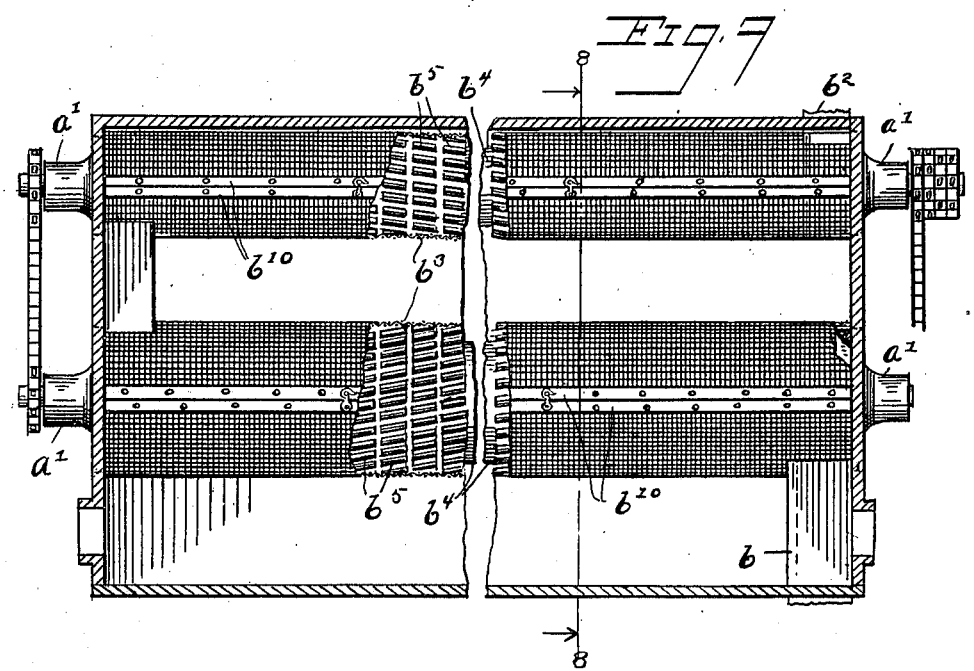

In said annexed drawings:—Figure 1 is a front elevation of a machine embodying my present improvements; Fig. 2 is a side elevation of the same as viewed from the left of Fig. 1; Fig. 3 is a rear elevation thereof; Fig. 4 is a longitudinal vertical section taken on the line 4—4, Figs. 1 and 3; Fig. 5 is a transverse section taken on the line 5—5, Figs. 2 and 4; Fig. 6 is a sectional view of a detail on an enlarged scale; Fig. 7 is similarly a sectional view, more or less diagrammatic in character, of another detail, while Figs. 8 and 9 illustrate in transverse and longitudinal section, respectively, a modified construction of the machine.

It will be understood that in many locations it will be convenient to have the delinting machine connected directly with the seed discharge of the gin, said delinting machine being then operated in effect, in conjunction with the gin. Irrespective, however, of whether the seed be thus supplied or be drawn from a general storage bin, it will be received in a hopper A mounted transversely of the forward end of the machine, from which hopper such seed is fed to the machine proper by a suitable feeding mechanism $A^1$, the details of which need not be here noted, forming as they do, no part of the present invention. It will suffice, accordingly, to say that by means of such feeding device, not only are the seeds fed downwardly through the chute $a$, leading to the delinting machine, at a regular rate, but such feed is distributed evenly across the machine so that the several duplicate sets of parts composing the machine are assured a uniform and even supply of material to operate upon.

Turning to the delinting mechanism proper, two duplicate sets, or batteries, of rolls are shown as being employed in the one illustrated. There is no necessary limitation, however, in this respect to the particular number thus illustrated, since any number desired may be employed depending upon the quantity of material to be handled in any given time. Each such battery in the preferred arrangement, comprises two upper casings B disposed side by side, within which is housed the delinting mechanism proper, and a single lower casing $B^1$ of considerably larger dimensions disposed below and parallel with said upper casings. The material from the feeding device is received at the front end of the pair of upper casings, and through them conveyed to their rear ends and there transferred to the lower casing to be conveyed to the forward end of the machine whence the product of delinted seeds is discharged by a chute $b$. The lint, however, that has been removed in the course of the travel of the seeds in this fashion from one end of the machine to the other and back again, is removed by an air blast, preferably suction, through a suitable conveyer tube $B^2$ having branches $b^1$ connected with the rear ends of the respective casings. The discharge chute $b$ affords an air supply opening for the lower casing, while duct $b^2$ over the forward ends of the upper casings serve a like function in connection therewith.

The general form of the several casings B B$^1$, which in their details of construction are alike, is a matter of indifference, but preferably they are of the rectangular form shown, that being the simplest and most easily constructed, providing in effect elongated boxes or closed troughs. Suitably supported within each casing, is a lining shell $b^3$ of abrading material having a substantially cylindrical form. Preferably we use as the material for such lining, a finely woven wire mesh or net, and this lining is supported more or less free from the adjacent walls of the casing except at the points of support (see Fig. 5). Such lining, furthermore, is not strictly circular in transverse cross section, but as will be seen, by reference to Fig. 7, the lower and upper sections thereof are concentric with respect to axes, that while parallel are located the one slightly above the other.

Rotatably mounted within each casing, is a drum $b^4$ that is preferably constructed of wood, but may be built up of metal or other suitable material, the respective ends of such drum being journaled in suitable bearings $a^1$ as shown in Fig. 4. The axis of this drum coincides with that of the lower portion of the casing lining, as result of which it will be seen that a larger clearance exists between the upper portion of such lining and such drum's surface than between the lower portion and drum's surface. Attached to said drum, is a plurality of resilient members $b^5$ disposed as shown in Fig. 4, which members are adapted to press outwardly against the inclosing casing lining. These members are preferably composed of flaps or strips of rubber coated fabric, similar to that found in ordinary hose, and are of a sufficient degree of thickness, and stiffness to press outwardly against the lining and rub thereagainst as the drum is rotated within such casing. The preferred arrangement of these strips or flaps is illustrated in Fig. 4, from which it will be seen that they are disposed on a series of helical lines of increasing pitch in successive sections of the drum from the front to the rear end thereof. By reason of the foregoing construction, when the seeds are introduced into the drum at the feed end, they will not only be rubbed against the abrading material that lines the casing, when the drum is rotated, but they will also be advanced longitudinally of said casing until they are finally ejected at the rear end. Here they drop into the lower casing or through chute $b$, as the case may be. In the lower casing the flaps, or resilient members are, of course, arranged to convey said seeds in a direction opposite to that in the upper casings, incidentally to the abrasion or rubbing of them against its lining. When said seeds are thus finally discharged substantially every particle of lint has been rubbed off, and the shell or hull given a finely polished appearance, all without endangering in the slightest, the integrity of the hull, or crushing the kernel, which of course, it is essential should remain intact. Simultaneously with the passage of the seed and the removal of the lint therefrom, such lint is withdrawn by the suction conveyer tubes connected with the rear ends of the respective casings. By disposing the lining of the casing taken in a transverse plane, at a variable radial distance from the axis of the drum, the pressure of the resilient flaps against the seeds, is somewhat relieved in the upper portion of the casing, and such seeds thus given an opportunity to roll over and readjust themselves. In this way they are caused to present all sides to the abrading action of the lining.

Owing to the perforated character of the abrading lining of the several casings, any particles of sand, grit, or like foreign material, such as are apt to be associated with the seeds when received by the machine, are given an opportunity to escape by falling through the mesh and onto the floor $b^6$ of the casing. To facilitate the removal of any accumulation of such dirt, said floor is provided with an opening $b^7$ longitudinal thereof, and a dust-pan $b^8$, as it may be styled, is secured therebelow. By providing openings $b^9$ in the respective ends of each dust-pan, it is rendered a simple matter to blow out the dirt by inserting a hose from air supply at one end, while leaving the other unobstructed.

It has not been deemed necessary to describe in detail the driving connections for the several sets of rolls composing the respective batteries. Power, however, in the machine as illustrated, is received by a driving pulley $c$ on a shaft C transversely disposed of the machine near its forward end, and from this shaft power is conveyed not only to said drums but also to the feeding mechanism $a$ which, as explained, is likewise disposed at the forward end of the machine. While it has been found in actual practice that an arrangement of rolls, such as we have described as constituting a battery, provides a solid, compact and satisfactory construction, it will be seen that the principle of operation exemplified in the arrangement of drum and casing, with the abrading material as a lining, is susceptible to various dispositions other than such particular one illustrated. We should, hence, remark that it is a matter of indifference so far as the principle of the invention is concerned, whether a single casing and drum be thus employed, or a plurality thereof, cooperatively arranged, since by making a single drum of suitable dimensions, an equally satisfactory result in the way of delinting the seed is obtainable, and the question, hence remaining, is only one of capacity.

The modified form of construction illustrated in Figs. 8 and 9 has been suggested by practical experience with the form of mechanism already described, for it has been found that if the proper kind of mesh be used to form the abrading lining of the several casings, not merely will dirt and like heavier material pass through such lining into the inclosing box, but also the lint, or fine cotton fiber, that is removed from the seeds. Accordingly instead of inclosing the several lining cylinders or shells within boxes, more or less closely approaching the same, said cylinders may be supported in the open, or preferably, as shown in the figures referred to, within a large general inclosure B³, so that the lint thus escaping may be collected and withdrawn not from the casings direct, but from such inclosure. The lining cylinder we find sufficiently stiff to require no support intermediate of its ends save that afforded by bars $b^{10}$ that serve to retain the adjacent edges of the two sections of such lining cylinder together. These bars with their corresponding sections are preferably detachably secured together so that they may be entirely removed and the drum $b^4$ within thus left uncovered, when desired.

The general course of the seeds, in passing through the machine, is exactly the same at the forward ends of the several upper lining cylinders, and thence pass rearwardly where they are collected from adjacent pairs of such lining cylinders and passed forwardly through a lower cylinder. Any suitable means may be employed for removing the lint, but preferably an air blast admitted at the front end, or an air suction connected at the rear end, of the general inclosing casing B³, is utilized for this purpose.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. In a machine for delinting cotton seed, the combination with an outer shell of abrading material, of a device extending longitudinally in said shell, a plurality of series of members carried by said device, the members of each series being arranged longitudinally of said device and each of said members having an outer and an inner portion, the outer portion being adapted to wipe against the inner surface of the shell and being extended substantially concentric with the shell when the latter is empty of seed, and the inner portion of said member connecting the outer portion with the said device, said inner portion having a resilient part for pressing the said outer portion against the shell, and means for producing a relative rotative movement between the shell and the said device.

2. In a machine for delinting cotton seed, the combination with an outer shell of abrading material, of a device extending longitudinally in said shell, a plurality of series of members carried by said device, the members of each series being arranged in a general helical fashion about said device and each of said members having an outer and an inner portion, the outer portion being adapted to wipe against the inner surface of the shell and being extended substantially concentric with the shell when the latter is empty of seed, and the inner portion of said member connecting the outer portion with the said device, said inner portion having a resilient part for pressing the said outer portion against the shell, and means for producing a relative rotative movement between the shell and the said device.

3. In a machine for delinting cotton seed, the combination of a shell of abrading material, a drum rotatable within said shell, and a plurality of series of resilient members carried by said drum and having extended bearing surfaces that are adapted to press the seeds against said shell, said bearing surfaces being substantially concentric with the shell, and contacting therewith while the shell is empty of seed, and the individual members in each series being movable toward and from the drum independently of the other members of the series.

4. In a machine for delinting cotton seed, the combination of a shell of abrading material, a drum rotatable within said shell, and a plurality of series of resilient members carried by said drum and having lateral surfaces arranged substantially parallel to said shell and adapted to press the seeds against said shell, said members of each series being arranged in a general helical fashion about said drum, whereby they serve to simultaneously advance such seeds longitudinally of said shell, and the bearing surface of each member being substantially concentric with the shell and contacting therewith when the latter is empty of seed.

5. In a machine for delinting cotton seed, the combination with a shell of abrading material, of a rotatable device within said shell, a plurality of series of members carried by said device, said members having outer portions that are adapted to wipe against the inner surface of the shell and that are extended substantially concentric with the shell when the latter is empty of seed, and inner portions connecting the outer portions with the said rotatable device, said inner portions having a resilient part for pressing the said outer portions against the shell, for the purpose specified, the individual members in each series being movable toward and from the device independently of the other members in the series.

6. In a machine of the class described, the combination of a shell of abrading material, a drum rotatable within said shell, and a plurality of flaps of resilient material attached to said drum and doubled over so as to present a lateral surface substantially parallel to and against said shell, whereby the seeds to be cleaned may be rolled between said flaps and shell.

7. In a machine of the class described, the combination of a shell of abrading material, a drum rotatable within said casing, and a plurality of flaps of resilient material attached to said drum and doubled over so as to present a lateral surface substantially parallel to and against said shell, whereby the seeds to be cleaned may be rolled between said flaps and shell, said flaps being arranged in a general helical fashion about said drum, whereby they serve to simultaneously advance such seeds longitudinally of said shell.

8. In a machine of the class described, the combination of a shell of abrading material, a drum rotatable within said shell, and a plurality of longitudinally extending series of flaps of resilient material carried by said drum and bent so as to present a lateral surface substantially parallel to said shell, and adapted to press seeds against said shell, said flaps being arranged on helical lines of increasing pitch in successive sections of said drum.

9. In a machine of the class described, the combination of a shell of abrading material, a drum rotatable within said shell, and a plurality of longitudinally extending series of flaps of resilient material attached to the surface of said drum and doubled over so as to present a lateral surface substantially parallel to and against said shell, whereby the seeds to be cleaned may be rolled between said flaps and shell, said flaps being arranged on helical lines of increasing pitch in successive sections of said drum.

Signed by me this 14th day of October, 1909.

PHINEAS F. KING.

Attested by—
ANNA L. GILL,
JNO. F. OBERLIN.